United States Patent [19]

Ostermeier

[11] Patent Number: 4,626,091

[45] Date of Patent: Dec. 2, 1986

[54] PHOTOGRAPHIC CAMERA

[75] Inventor: Heinrich Ostermeier, Cologne, Fed. Rep. of Germany

[73] Assignee: Happycard International Limited, Shannon, Ireland

[21] Appl. No.: 777,699

[22] Filed: Sep. 19, 1985

[30] Foreign Application Priority Data

Sep. 21, 1984 [DE] Fed. Rep. of Germany ....... 3434633

[51] Int. Cl.⁴ ............................................. G03B 15/08
[52] U.S. Cl. ...................................... 354/75; 354/108; 354/110; 355/40; 352/47
[58] Field of Search ...................... 354/76, 77, 75, 105, 354/106, 107, 108, 109, 110, 120, 125, 150; 355/40, 43, 46, 56; 352/47, 89

[56] References Cited

U.S. PATENT DOCUMENTS

| | | | |
|---|---|---|---|
| 3,331,298 | 7/1967 | Wiggins et al. | 354/120 |
| 3,665,828 | 5/1972 | Reiter | 354/110 |
| 4,011,570 | 3/1977 | Stievenart et al. | 354/109 |
| 4,018,519 | 4/1977 | Clapp | 352/89 |
| 4,310,232 | 1/1982 | Reed | 354/125 |
| 4,350,419 | 9/1982 | Bowan | 355/39 |
| 4,533,224 | 8/1985 | Ou | 354/77 |

FOREIGN PATENT DOCUMENTS 3127291  5/1983  Fed. Rep. of Germany .

Primary Examiner—A. A. Mathews
Attorney, Agent, or Firm—Birch, Stewart, Kolasch & Birch

[57] ABSTRACT

A photographic camera for producing a composite picture comprises a casing including means for producing an image of an external object or scene on a first portion of an unexposed photographic medium disposed in an image plane within the casing and a plurality of projection systems for producing respective static thematic images on other respective portions of the medium. The light from each projection system is transmitted freely within the casing to the vicinity of the image plane, and a multi-aperture framing element is provided adjacent the image plane. The light from each projection system and the light from the external object or scene pass through respective apertures of the framing element to fall on respective areas of the medium which are delimited from each other by the apertures of the framing element.

9 Claims, 4 Drawing Figures

PHOTOGRAPHIC CAMERA

FIELD OF THE INVENTION

The invention relates to a photographic camera for producing a composite picture, the camera comprising a casing including means for producing an image of an external object or scene on a first portion of an unexposed photographic medium disposed in an image plane within the casing and a plurality of projection systems for producing respective static thematic images on other respective portions of the medium.

With such a camera it is possible to compose picture postcards combining various static thematic images such as typical country views with an actual shot (such as a portrait) in a variety of sizes and shapes.

BACKGROUND OF THE INVENTION

A photographic camera with the abovementioned features is described in German Patent Specification No. 31 27 291 Cl. In this case the casing of the photographic camera is compartmentalised to define a number of separate light paths directed at various areas of the image plane, and incorporates slide holders and projection systems for reproducing thematic transparencies as well as a direct photographic system for the reproduction of the image proper or actual shot. If a camera of this kind were built so that the light rays of the projection systems are transmitted freely, i.e. not through separate enclosed light compartments, the construction would be greatly simplified, but there is a danger that parts of the thematic images and/or of the actual shot (the externally-derived image) will overlap and be superimposed on each other.

SUMMARY OF THE INVENTION

It is an object of the invention to provide a camera design in which the light rays of the projection systems are freely transmitted but in which nevertheless it is possible to produce on the photographic medium sharply defined thematic images in combination with an actual shot.

This is accomplished according to the invention by the improvement wherein the light from each projection system is transmitted freely within the casing to the vicinity of the image plane, and wherein a multi-aperture framing element is provided adjacent the image plane, the light from each projection system and the light from the external object or scene passing through respective apertures of the framing element to fall on respective areas of the medium which are delimited from each other by the apertures of the framing element.

In such a system where the light rays are freely transmitted within the casing, a framing element of the above kind produces flawless, sharply defined edges to the component images of the composite picture and is especially capable of achieving sharp edge definition in various arrangements of the projected thematic images on the corresponding areas of the photographic medium. In addition, the framing element provides a means of compensating for tolerances in the manufacture and assembly of individual components of the camera.

The static thematic images may be non-transparent and be illuminated by light falling on their picture-bearing surfaces, or they may preferably take the form of transparencies illuminated by transmitted light. In the latter case they may be illuminated by external light source(s) or light source(s) provided in the camera. A specially suitable solution is the use of a flash tube for the simultaneous illumination of some or all of the static thematic transparencies for the projection systems.

The framing element is suitably spaced slightly away from the image plane so as to avoid damage to the photographic medium. In this connection it is preferable to locate those parts of the framing element which determine the outline of the component parts of the composite picture at such a distance from the surface of the picture carrier that the marginal light rays of the actual shot (externally-derived image) and those of the static thematic images substantially coincide or meet at the surface of the photographic medium which is located in the image plane. This ensures that the edges of directly adjacent components of the composite picture are sharply defined.

It is convenient that the framing element is designed to be interchangeable in the casing to accommodate actual shots and thematic images of different shapes and sizes.

The framing element may conveniently comprise a closed outer peripheral wall, an inner wall defining a central framing aperture for the external image, and a plurality of further walls extending from the inner surface of the outer wall to the outer surface of the inner wall to define a plurality of apertures for the thematic images. For the design of the framing element there are a number of possibilities. For example, the central framing aperture delimiting the actual (external) shot may be round, angular, heart-shaped, etc., and there may be two, three, four or more further walls joining the inner and outer walls depending on the arrangement of the projection systems for the thematic images. For some applications it may be expedient to divide the outer portion of the framing element into two or more components. The depth of the framing element and the thickness of its walls are determined by the angle of incidence of the marginal rays of the projection beams and its spacing from the image plane. The framing element preferably takes the form of a plastics moulding made in one piece.

Instead of a flash tube or lamp, the light source may conveniently be provided by a light-emitting surface in the form of a plate-shaped liquid crystal display (LCD). Such LCDs are used for picture transmission in microfilm technology.

Another convenient embodiment can be achieved by arranging the projection systems for the thematic images in pairs, each with its own light source, and by using 90° deflecting mirrors to direct the light paths of the projection systems into the plane of the framing element. This results in uniform illumination of the projection systems and facilitates a handy camera design in which the casing contains in individual compartments to the side of a direct, non-deflected beam carrying the actual shot two projection systems for thematic images. The ray paths of these projection systems are bent by 90° deflecting mirrors into the plane of the framing element and thence on to the surface of the picture carrier.

BRIEF DESCRIPTION OF THE DRAWINGS

An embodiment of the invention is shown in the accompanying drawings, in which:

FIGS. 1 and 2 show a light-proof camera casing 1 divided into an upper portion 2, a middle portion 3 and a lower portion 4.

Figure 1:
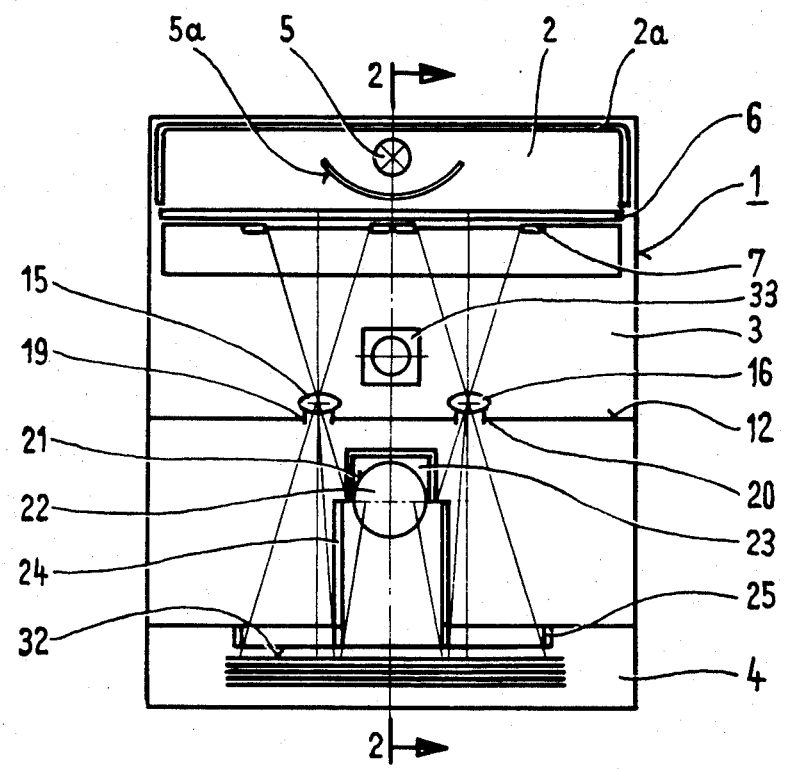
FIG. 1 is a longitudinal section through a photographic camera.

The upper portion 2 of the casing contains a light source 5 such as a flash tube, lamp or the like which illuminates a ground glass plate 6. The illumination is preferably indirect, for which purpose the light source 5 may be screened from the plate 6 by suitable light-scattering or distributing elements 5a to ensure uniform light distribution on the plate 6. Portion 2 of the casing contains a light-scattering insert 2a with a blackened area 35 (shaded area in FIG. 3), to assist the uniform illumination.

Figure 3:
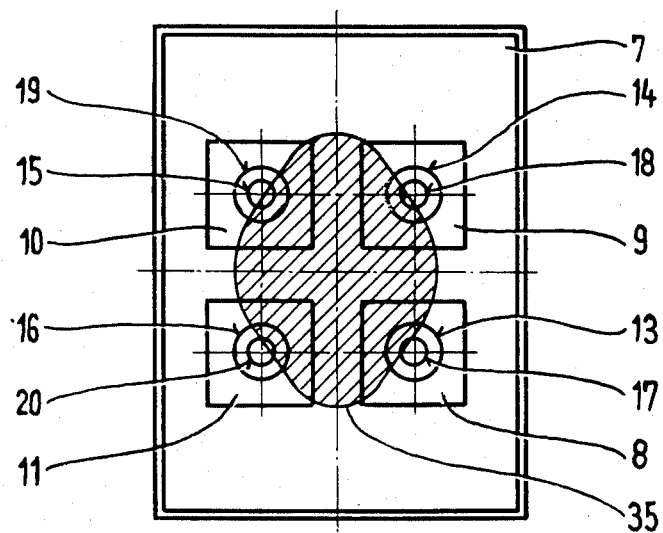
FIG. 3 is a section along the line 3—3 in FIG. 2.
Figure 2:
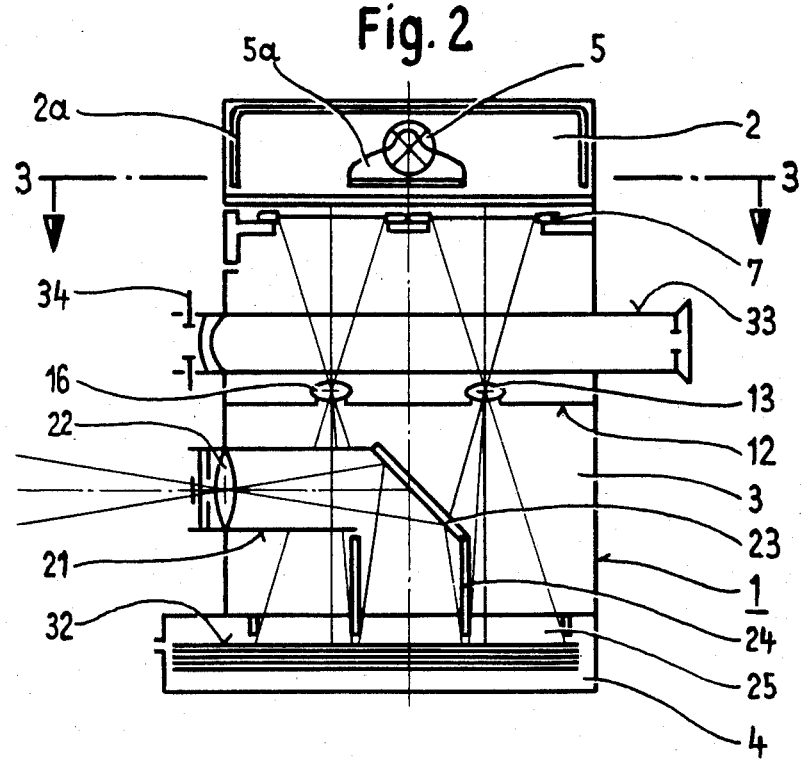
FIG. 2 is a section along the line 2—2 in FIG. 1.

Below the ground glass plate 6 is located a slide-in slide holder 7 which fits into the casing 1 and, as shown in FIG. 3, contains four recesses 8, 9, 10, and 11 for holding transparencies used to provide the thematic images.

The middle portion 3 of the casing contains a partition 12 in which are incorporated four projection systems 13, 14, 15 and 16 respectively in the form of lens combinations. The projection systems have identical apertures 17, 18, 19 and 20 respectively.

The actual shot or image proper is photographed via a horizontal light compartment 21 containing a lens 22 with an adjustable diaphragm and shutter of conventional form. At the rear end of the horizontal light compartment 21 a 90° deflecting mirror 23 directs the rays into a vertical light compartment 24 which extends downwards until it mates against the walls 31 of a central aperture (FIG. 4) of a framing element 25. In addition the framing element 25 and the partition 12 incorporating the projection systems 13, 14, 15 and 16 may conveniently be made interchangeable so that the area of the actual shot may be combined with thematic images of different shapes and sizes.

Figure 4:
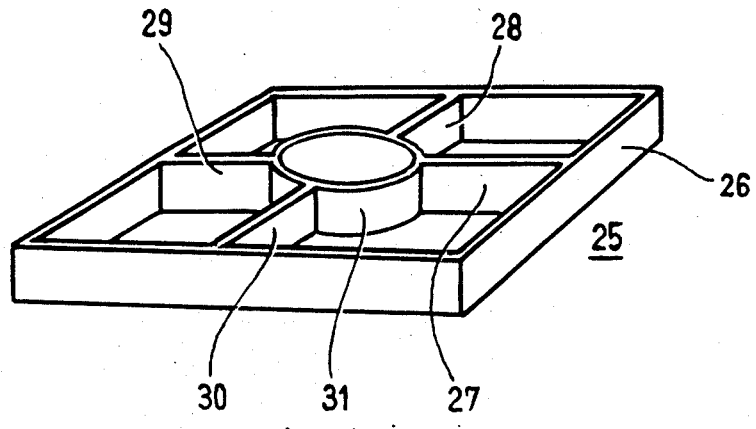
FIG. 4 is an isometric view of a framing element.

As is shown in FIG. 4, the framing element 25 comprises a closed outer peripheral wall 26, an inner circular wall 31 defining a central framing aperture for the external image, and a plurality of further walls 27, 28, 29 and 30 extending from the inner surface of the outer wall 26 to the outer surface of the inner wall 31 to define a plurality of apertures for the thematic images. The edge of the wall 31 mates with the vertical light compartment 24, as mentioned above.

The lower portion 4 of the casing contains the framing element 25 and unexposed photographic material in the form of a conventional multiple pack of film 32. However, other forms of photographic film feed devices may be used, for example film spools. In all cases the unexposed film, or in the case of the multiple pack shown, the uppermost film of the stack, is located in the image plane of the projection systems 13 to 16.

The framing element 25 is spaced slightly away from the image plane defined by the surface of the upper film of the stack 32, the distance separating the framing element from the image plane being selected so that the marginal light rays of adjacent images (both thematic and external) substantially coincide at the image plane.

Beyond the framing element 25 of shallow depth, the inside of the casing 1 requires no special separate light paths or compartments between the slide holder 7, the projection systems 13, 14, 15 and 16, and the film pack 32 or equivalent. The framing element 25 results in a sharply defined separation of the individual image areas.

The middle portion 3 of the casing contains a viewfinder with a horizontal viewfinder tube 33 fitted with an interchangeable diaphragm 34. The shape of this easily changed diaphragm can be conveniently matched to the cross-sectional shape of the tubular vertical light compartment 24 used for the actual shot.

The other camera components, including the wiring and power supply of the light source 5, may be of conventional design and have been omitted from the schematic drawings for the sake of clarity.

I claim:

1. In a photographic camera for producing a composite picture, the camera comprising a casing including means for producing an image of an external object or scene on a first portion of an unexposed photographic medium disposed in an image plane within the casing and a plurality of projection systems for producing respective static thematic images on other respective portions of the medium, the improvement wherein the light from each projection system is transmitted freely within the casing to the vicinity of the image plane, and wherein a multi-aperture framing element is provided adjacent the image plane, the light from each projection system and the light from the external object or scene passing through respective apertures of the framing element to fall on respective areas of the medium which are delimited from each other by the apertures of the framing element.

2. A photographic camera according to claim 1, in which the framing element is spaced slightly away from the image plane.

3. A photographic camera according to claim 2, in which the distance separating the framing element from the image plane is selected so that the marginal light rays of adjacent images substantially coincide at the image plane.

4. A photographic camera according to claim 1, in which the framing element is interchangeable to accommodate external images and thematic images of different shapes and sizes.

5. A photographic camera according to claim 1, in which the framing element comprises a closed outer peripheral wall, an inner wall defining a central framing aperture for the external image, and a plurality of further walls extending from the inner surface of the outer wall to the outer surface of the inner wall to define a plurality of aperatures for the thematic images.

6. A photographic camera according to claim 1, in which the framing element is a one-piece plastics moulding.

7. A photographic camera according to claim 1, further comprising a liquid crystal unit for collective illumination of the projection systems.

8. A photographic camera in accordance with claim 1, in which the projection systems for the thematic images are arranged parallel with common light source and the light path of the external image is turned by a 90° deflecting mirror into the plane of the framing element.

9. A photographic camera in accordance with claim 1, in which the projection systems for the thematic images are arranged in pairs, each with its own light source, and the light paths of the projection systems are turned by 90° deflecting mirrors into the plane of the framing element.

* * * * *